(12) United States Patent
Vemulapati et al.

(10) Patent No.: US 12,036,951 B2
(45) Date of Patent: Jul. 16, 2024

(54) STORAGE BOX FOR A VEHICLE

(71) Applicant: Ford Global Technologies, LLC, Dearborn, MI (US)

(72) Inventors: Satyanarayana Raju Vemulapati, Westland, MI (US); Juergen Koehler, Cologne (DE); Linh Ngoc Doan, Belleville, MI (US); Brent Clifford Dalton, Dearborn, MI (US); Bhavani Thota, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 881 days.

(21) Appl. No.: 17/034,313

(22) Filed: Sep. 28, 2020

(65) Prior Publication Data

US 2022/0097612 A1 Mar. 31, 2022

(51) Int. Cl.
*B60R 7/04* (2006.01)
*E05C 9/04* (2006.01)
*E05C 9/10* (2006.01)
*E05C 9/18* (2006.01)
(Continued)

(52) U.S. Cl.
CPC ............... *B60R 7/04* (2013.01); *E05C 9/042* (2013.01); *E05C 9/10* (2013.01); *E05C 9/1808* (2013.01); *E05D 3/00* (2013.01); *E05D 7/1011* (2013.01); *E05D 2007/1027* (2013.01); *E05Y 2600/622* (2013.01); *E05Y 2900/538* (2013.01)

(58) Field of Classification Search
CPC ........... B60R 7/04; E05D 7/1011; E05D 3/00; E05D 2007/1027; E05C 9/1808; E05C 9/042; E05C 9/10; E05C 9/04; E05C 9/045; E05C 9/14; E05Y 2600/622; E05Y 2900/538; E05B 15/022; E05B 15/0225; E05B 15/024; E05B 15/0255; E05B 2015/027; E05B 85/04; E05B 83/28; E05B 83/30; E05B 83/34; Y10T 292/696; B60N 2/793; B60N 2/763

See application file for complete search history.

(56) References Cited

U.S. PATENT DOCUMENTS 6,142,333 A * 11/2000 Sasamoto ............... E05B 83/32
220/264
7,686,364 B2 3/2010 Hehn
7,810,862 B2 10/2010 Smith
(Continued)

FOREIGN PATENT DOCUMENTS

DE 10247453 A1 4/2004
DE 102005055138 A1 5/2007
(Continued)

OTHER PUBLICATIONS

Computer translation for JP0H0711835 (Year: 1995).*

*Primary Examiner* — Amy R Weisberg
*Assistant Examiner* — Melissa Ann Bonifazi
(74) *Attorney, Agent, or Firm* — Vichit Chea; Price Heneveld LLP

(57) ABSTRACT

A storage box includes a door that is coupled to the base. A pivot pin is coupled to the door and is operable between an engaged position, wherein the pivot pin is rotatably engaged with the base, and a disengaged position. The pivot pin is configured to move door-inboard due to contact with the base as the pivot pin moves from the disengaged position to the engaged position.

13 Claims, 15 Drawing Sheets

(51) Int. Cl.
*E05D 3/00* (2006.01)
*E05D 7/10* (2006.01)

(56) References Cited

U.S. PATENT DOCUMENTS

| | | |
|---|---|---|
| 8,100,453 B2 | 1/2012 | Shimajiri |
| 9,302,628 B2 | 4/2016 | Smith |
| 9,707,899 B2 * | 7/2017 | Thomas ................. B65D 43/22 |
| 2009/0218361 A1 | 9/2009 | Dammers |

FOREIGN PATENT DOCUMENTS

| | | |
|---|---|---|
| DE | 102010033150 A1 | 2/2012 |
| EP | 0490468 A1 | 6/1992 |
| EP | 0494496 B1 | 4/1995 |
| EP | 0495290 B1 | 6/1995 |
| EP | 0491113 B1 | 10/1995 |
| EP | 0491126 B1 | 3/1996 |
| EP | 1304439 B1 | 3/2005 |
| JP | 0711835 A | 1/1995 |
| JP | H0711835 A * | 1/1995 |
| JP | 2664618 B2 | 10/1997 |

* cited by examiner

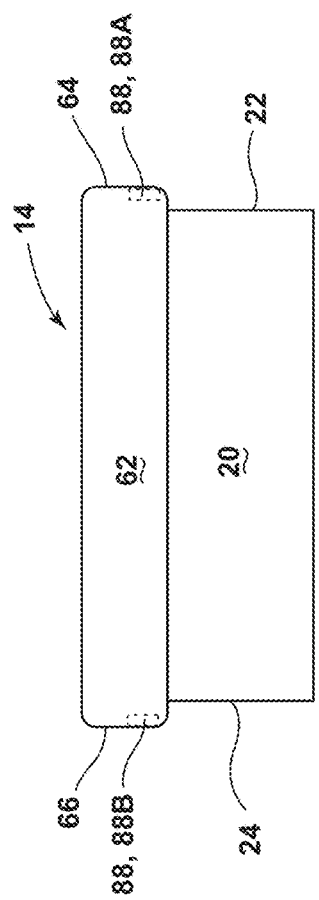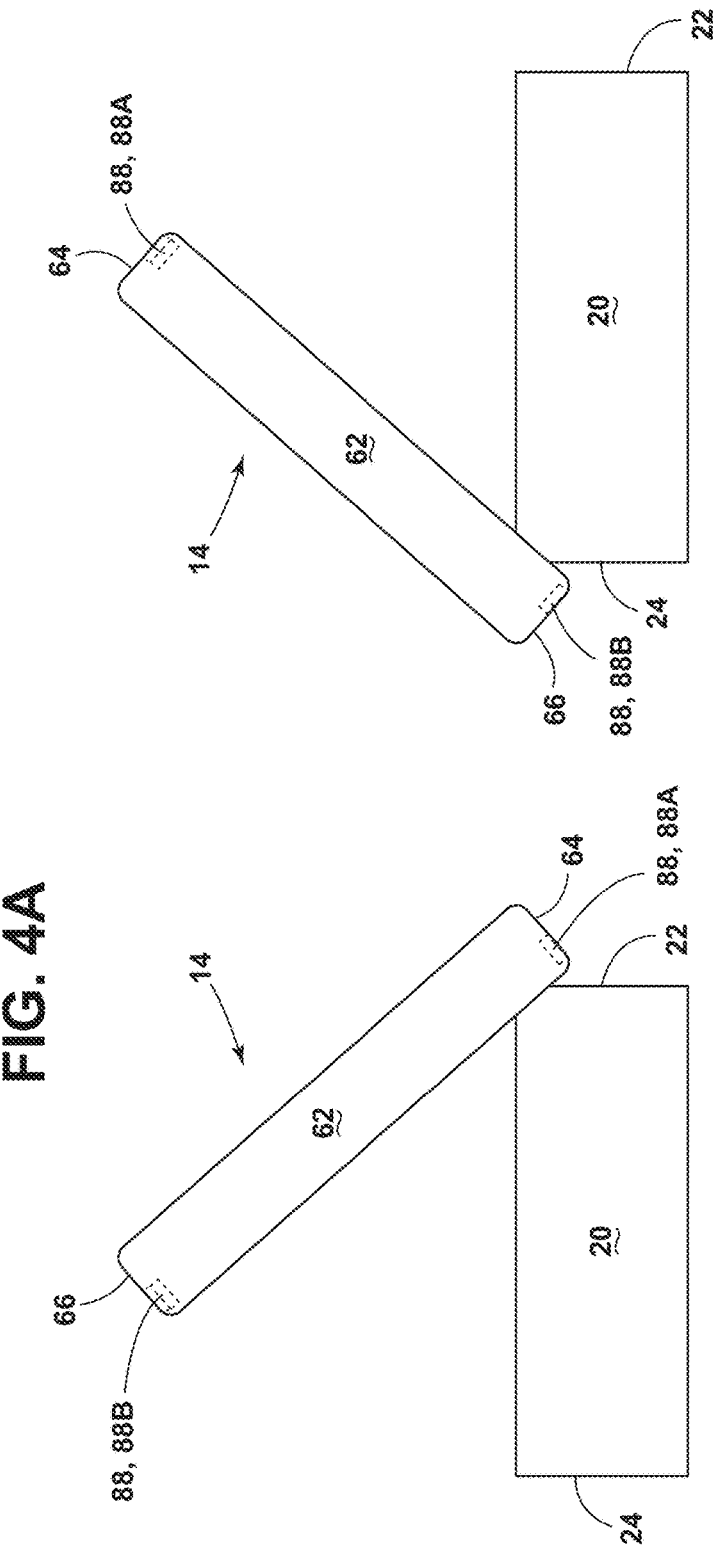

STORAGE BOX FOR A VEHICLE

FIELD OF THE DISCLOSURE

The present disclosure generally relates to a storage box for a vehicle. More specifically, the present disclosure relates to a storage box having a door that can be pivoted open at both ends of the storage box.

BACKGROUND OF THE DISCLOSURE

Vehicles often include center consoles and other storage bins with pivoting doors. In vehicles that include front and rear rows of seating, a storage box that includes a door that can be pivoted open in a first direction by occupants seated in a front row and in a second direction by occupants seated in a rear row in a user-friendly manner may be desired.

SUMMARY OF THE DISCLOSURE

According to a first aspect of the present disclosure, a storage box for a vehicle includes a base having a receptacle, a first end, and a second end opposite the first end. A door is operably coupled to the base and includes a first end and a second end opposite the first end. A first pivot pin is coupled to the door generally proximate to the first end of the door and is operable between an engaged position, wherein the first pivot pin is rotatably engaged with the base proximate to the first end of the base, and a disengaged position, wherein the first pivot pin is disengaged from the base. A first biasing feature is coupled to the first pivot pin and is configured to bias the first pivot pin in a door-outboard direction. A second pivot pin is coupled to the door generally proximate to the second end of the door and is operable between an engaged position, wherein the second pivot pin is rotatably engaged with the base proximate to the second end of the base, and a disengaged position, wherein the second pivot pin is disengaged from the base. A second biasing feature is coupled to the second pivot pin and is configured to bias the second pivot pin in a door-outboard direction. The door is operable between a closed position, wherein the first and second pivot pins are in the engaged positions, a first open position, wherein the first pivot pin is in the engaged position and the second pivot pin is in the disengaged position, and a second open position, wherein the second pivot pin is in the engaged position and the first pivot pin is in the disengaged position. As the door moves from the second open position to the closed position, the first pivot pin is configured to sequentially contact the base, move door-inboard against the bias of the first biasing feature due to an angle of incidence between the base and the first pivot pin, and move door-outboard due to the bias of the first biasing feature to the engaged position. As the door moves from the first open position to the closed position, the second pivot pin is configured to sequentially contact the base, move door-inboard against the bias of the second biasing feature due to an angle of incidence between the base and the second pivot pin, and move door-outboard due to the bias of the second biasing feature to the engaged position.

Embodiments of the first aspect of the present disclosure may include any one or a combination of the following features:
  the base comprises a first striker feature disposed generally proximate to the first end of the base and configured to receive the first pivot pin therein as the first pivot pin enters the engaged position, such that the first pivot pin is configured to be rotatably engaged with the first striker feature, and a second striker feature disposed generally proximate to the second end of the base and configured to receive the second pivot pin therein as the second pivot pin enters the engaged position, such that the second pivot pin is configured to be rotatably engaged with the second striker feature;
  the first pivot pin is configured to move door-inboard against the bias of the first biasing feature due to the angle of incidence between a contact surface of the first striker feature of the base contacting the first pivot pin as the door moves from the second open position to the closed position, and the second pivot pin is configured to move door-inboard against the bias of the second biasing feature due to the angle of incidence between a contact surface of the second striker feature of the base contacting the second pivot pin as the door moves from the first open position to the closed position;
  the first and second striker features are integrally coupled with the base;
  a first actuator coupled to the door and operable between an actuated position and an unactuated position, wherein movement of the first actuator from the unactuated position to the actuated position is configured to move the first pivot pin door-inboard against the bias of the first biasing feature, and a second actuator coupled to the door and operable between an actuated position and an unactuated position, wherein movement of the second actuator from the unactuated position to the actuated position is configured to move the second pivot pin door-inboard against the bias of the second biasing feature;
  the first actuator is operable to remain in the unactuated position during movement of the door from the second open position to the closed position, and the second actuator is operable to remain in the unactuated position during movement of the door from the first open position to the closed position;
  the first pivot pin comprises an end portion configured to be rotatably engaged with the base in the engaged position of the first pivot pin and having a contact surface that extends from an outward-most portion to an inward-most portion, wherein the contact surface extends door-downward and door-inboard from the outward-most portion to the inward-most portion in the closed position of the door;
  the first pivot pin is configured to move door-inboard as the door moves from the second open position toward the closed position due to the angle of incidence between the base and the contact surface of the end portion; and
  the door is configured to pivot from the closed position to the first open position in a first direction and is configured to pivot from the closed position to the second open position in a second direction that is opposite the first direction.

According to a second aspect of the present disclosure, a storage box includes a base having a receptacle, a first end, and a second end. A door is coupled to the base and is operable to pivot in a first direction from a closed position to a first open position and pivot in a second direction opposite the first direction from the closed position to a second open position. A first pivot pin is coupled to the door and is operable between an engaged position, wherein the first pivot pin is rotatably engaged with the base generally proximate to the first end of the base, and a disengaged position, wherein the first pivot pin is disengaged from the base. A second pivot pin is coupled to the door and is operable between an engaged position, wherein the second pivot pin is rotatably engaged with the base generally proximate to the second end of the base, and a disengaged position, wherein the second pivot pin is disengaged from the base. The door is in the closed position if the first and second pivot pins are in the engaged positions. The first pivot pin is in the engaged position and the second pivot pin is in the disengaged position if the door is in the first open position. The second pivot pin is in the engaged position and the first pivot pin is in the disengaged position if the door is in the second open position. Movement of the door from the first open position to the closed position causes the second pivot pin to move in a door-inboard direction due to contact with the base and subsequently move in a door-outboard direction to the engaged position as the door enters the closed position.

Embodiments of the second aspect of the present disclosure may include any one or a combination of the following features:
- a first biasing feature coupled to the first pivot pin and configured to bias the first pivot pin door-outboard, and a second biasing feature coupled to the second pivot pin and configured to bias the second pivot pin door-outboard, wherein the second biasing feature is configured to move the second pivot pin door-outboard to the engaged position as the door enters the closed position from the first open position;
- the base comprises a first striker feature disposed generally proximate to the first end of the base and configured to receive the first pivot pin therein as the first pivot pin enters the engaged position, such that the first pivot pin is configured to be rotatably engaged with the first striker feature, and a second striker feature disposed generally proximate to the second end of the base and configured to receive the second pivot pin therein as the second pivot pin enters the engaged position, such that the second pivot pin is configured to be rotatably engaged with the second striker feature;
- the second pivot pin is configured to move door-inboard against the bias of the second biasing feature due to an angle of incidence between the second pivot pin and a contact surface of the second striker feature that contacts the second pivot pin as the door moves from the first open position to the closed position;
- the second pivot pin comprises an end portion configured to be rotatably engaged with the second striker feature of the base in the engaged position of the second pivot pin and having a contact surface that extends from an outward-most portion to an inward-most portion, wherein the contact surface extends door-downward and door-inboard from the outward-most portion to the inward-most portion in the closed position of the door; and
- the second pivot pin is configured to move door-inboard as the door moves from the first open position to the closed position due to the angle of incidence between the contact surface of the second striker feature and the contact surface of the end portion.

According to a third aspect of the present disclosure, a storage box includes a door that is coupled to the base. A pivot pin is coupled to the door and is operable between an engaged position, wherein the pivot pin is rotatably engaged with the base, and a disengaged position. The pivot pin is configured to move door-inboard due to contact with the base as the pivot pin moves from the disengaged position to the engaged position.

Embodiments of a third aspect of the present disclosure may include any one or a combination of the following features:
- the pivot pin is configured to move door-outboard to enter the engaged position;
- the door is configured to pivot between a first open position, wherein the pivot pin is in the disengaged position, and a closed position, wherein the pivot pin is in the engaged position;
- the door is configured to pivot between a second open position and the closed position while the pivot pin is in the engaged position via rotation of the pivot pin; and
- the door is configured to pivot from the closed position to the first open position in a first direction and is configured to pivot from the closed position to the second open position in a second direction that is opposite the first direction.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 4A is a side view of the storage box, illustrating the door in a closed position, according to one embodiment;

FIG. 4B is a side view of the storage box, illustrating the door in a first open position, according to one embodiment;

FIG. 4C is a side view of the storage box, illustrating the door in a second open position, according to one embodiment;

DETAILED DESCRIPTION OF THE PREFERRED EMBODIMENTS

Figure 1:
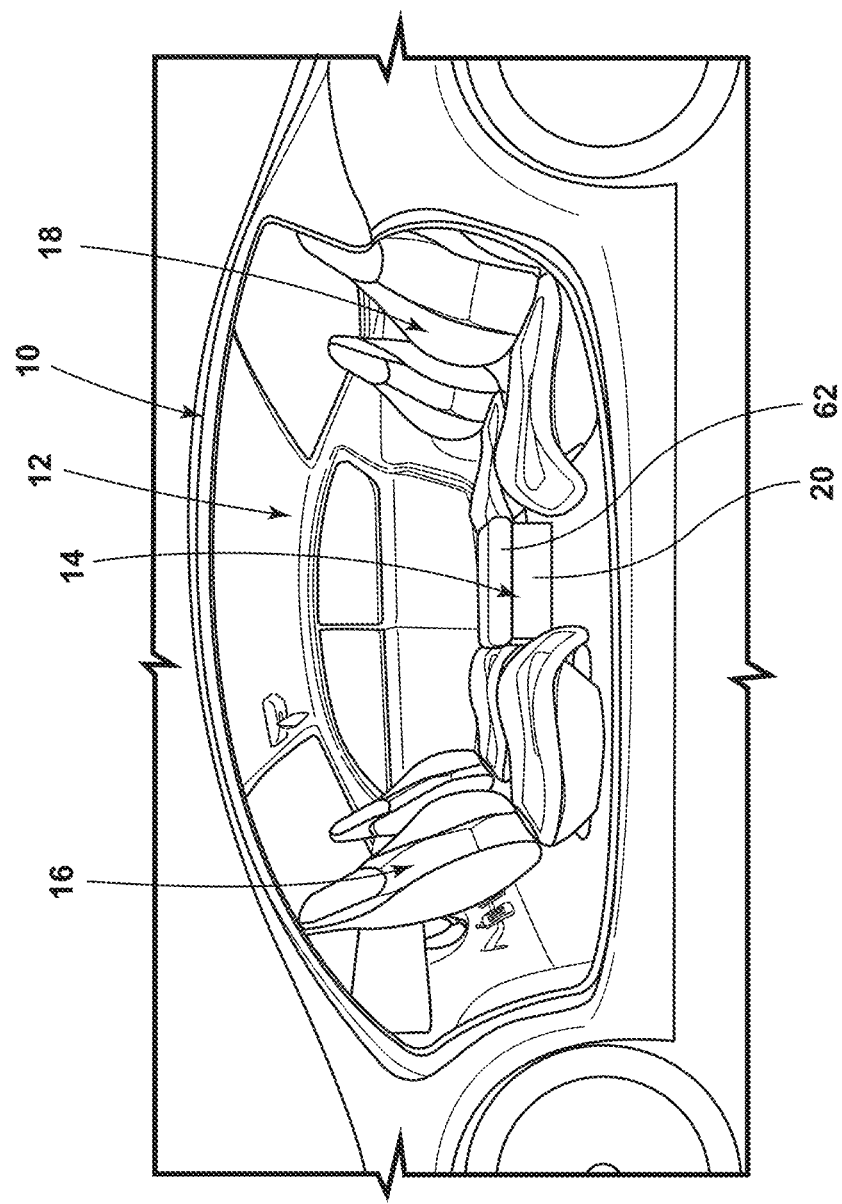
FIG. 1 is a perspective view of a vehicle, illustrating a storage box disposed within a vehicle interior, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-13, a storage box 14 includes a base 20 having a receptacle 26, a first end 22, and a second end 24 that is opposite the first end 22. A door 62 is operably coupled to the base 20 and includes a first end 64 and a second end 66 that is opposite the first end 64. A first pivot pin 72A is coupled to the door 62 generally proximate to the first end 64 of the door 62 and is operable between the engaged position, wherein the first pivot pin 72A is rotatably engaged with the base 20 proximate to the first end 22 of the base 20, and a disengaged position, wherein the first pivot pin 72A is disengaged from the base 20. A first biasing feature 86A is coupled to the first pivot pin 72A and is configured to bias the first pivot pin 72A in a door-outboard direction. A second pivot pin 72B is coupled to the door 62 generally proximate to the second end 66 of the door 62. The second pivot pin 72B is operable between an engaged position, wherein the second pivot pin 72B is rotatably engaged with the base 20 proximate to the second end 24 of the base 20, and a disengaged position, wherein the second pivot pin 72B is disengaged from the base 20. A second biasing feature 86B is coupled to the second pivot pin 72B and is configured to bias the second pivot pin 72B in a door-outboard direction. The door 62 is operable between a closed position, wherein the first and second pivot pins 72A, 72B are in the engaged positions, a first open position, wherein the first pivot pin 72A is in the engaged position and the second pivot pin 72B is in the disengaged position, and a second open position, wherein the second pivot pin 72B is in the engaged position and the first pivot pin 72A is in the disengaged position. As the door 62 moves from the second open position to the closed position, the first pivot pin 72A is configured to sequentially contact the base 20, move door-inboard against the bias of the first biasing feature 86A due to an angle of incidence between the base 20 and the first pivot pin 72A, and move door-outboard due to the bias of the first biasing feature 86A to the engaged position. As the door 62 moves from the first open position to the closed position, the second pivot pin 72B is configured to sequentially contact the base 20, move door-inboard against the bias of the second biasing feature 86B due to an angle of incidence between the base 20 and the second pivot pin 72B, and move door-outboard due to the bias of the second biasing feature 86B to the engaged position.

Figure 2:
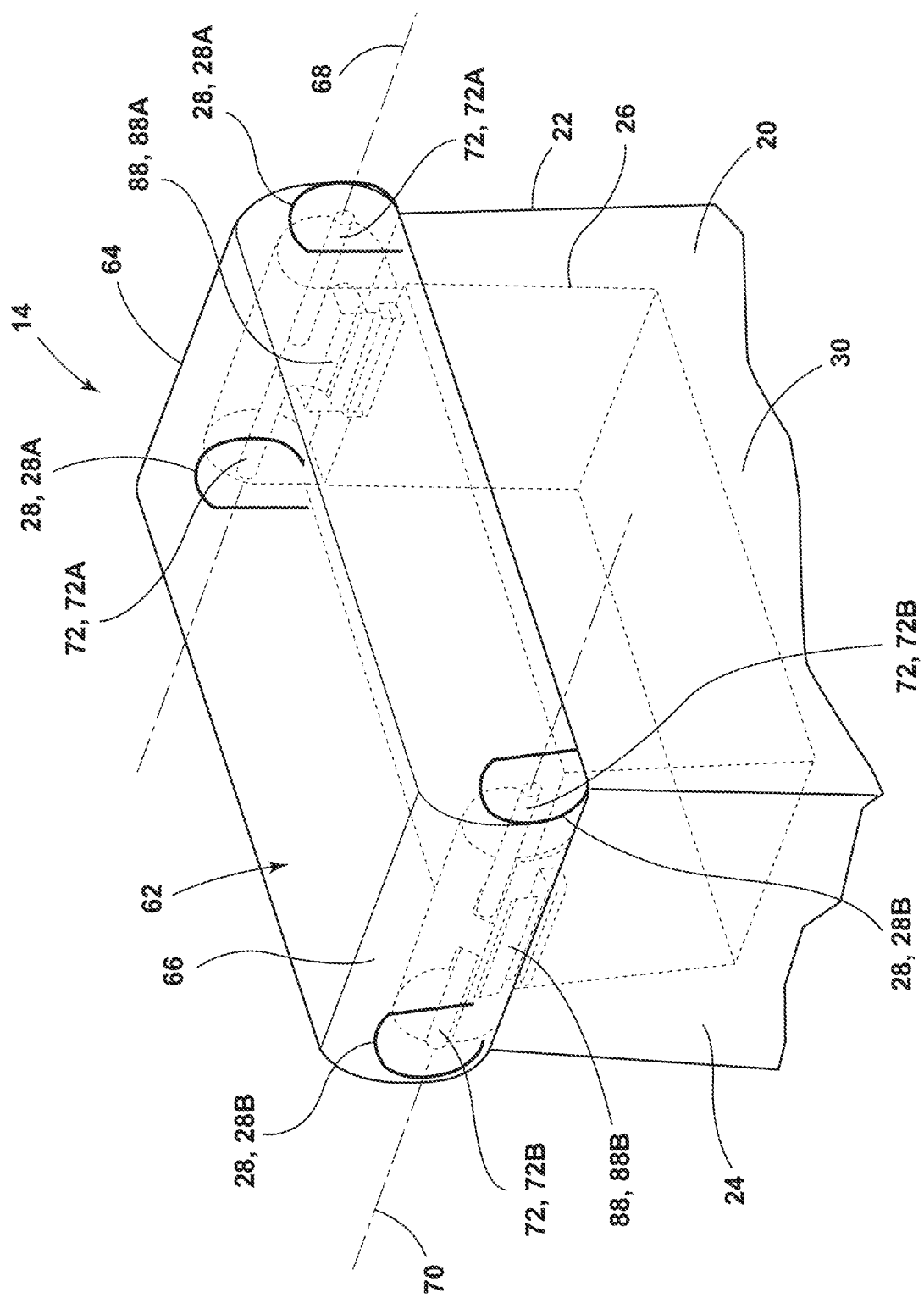
FIG. 2 is a perspective view of the storage box, illustrating a door in a closed position and first and second pivot axes generally corresponding with first and second pivot pins shown in phantom, according to one embodiment.
Figure 3:
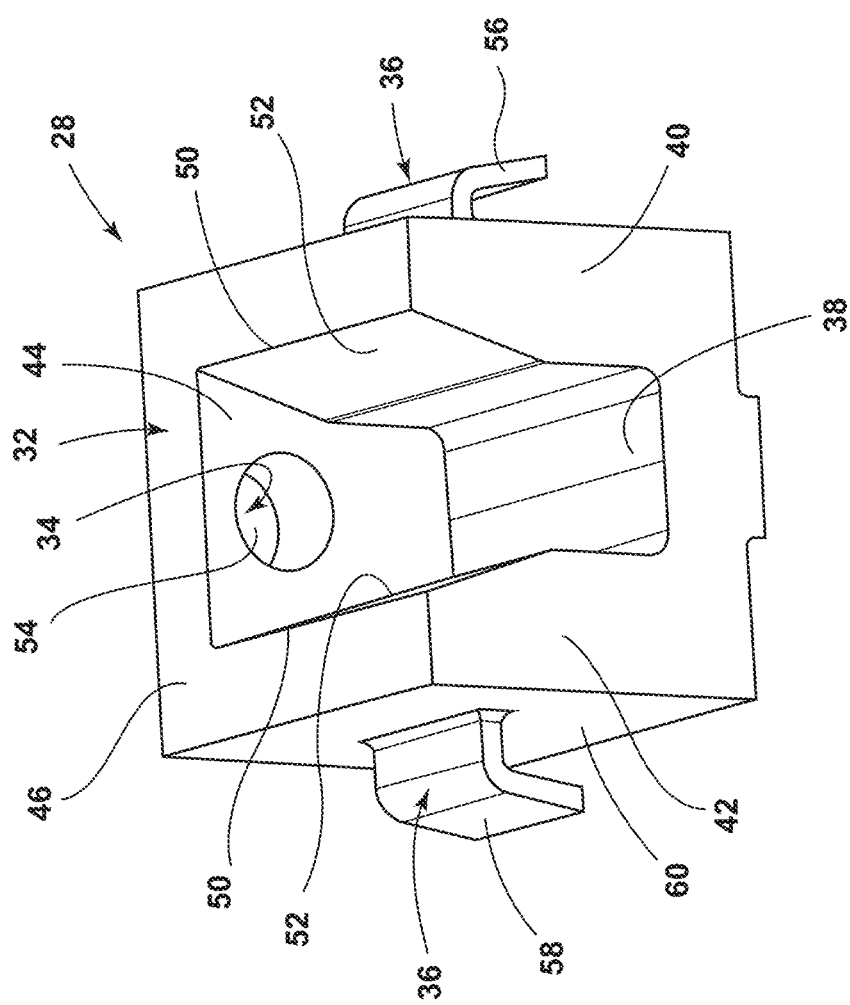
FIG. 3 is a perspective view of a striker feature, according to one embodiment.
Figure 5B:
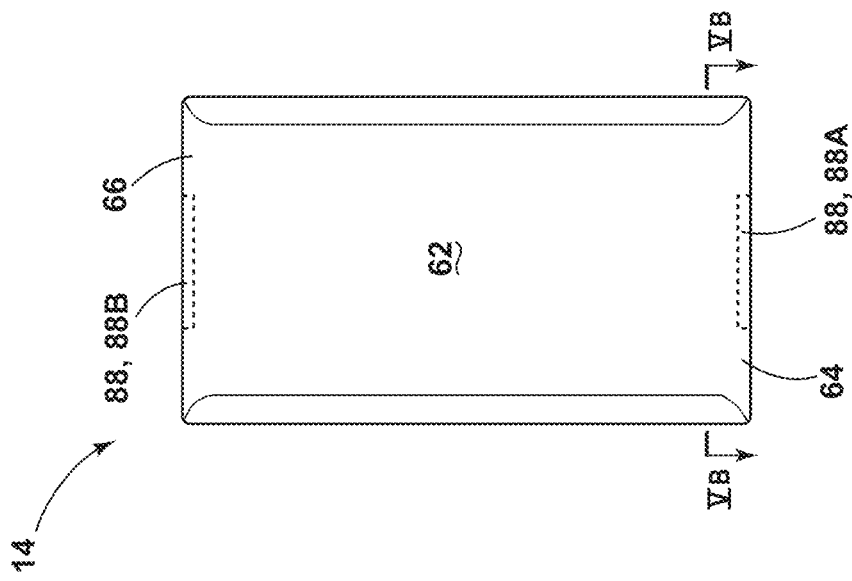
FIG. 5B is a top view of the storage box, illustrating the door of the storage box in the closed position and the first and second actuators in the unactuated positions, according to one embodiment.
Figure 5A:
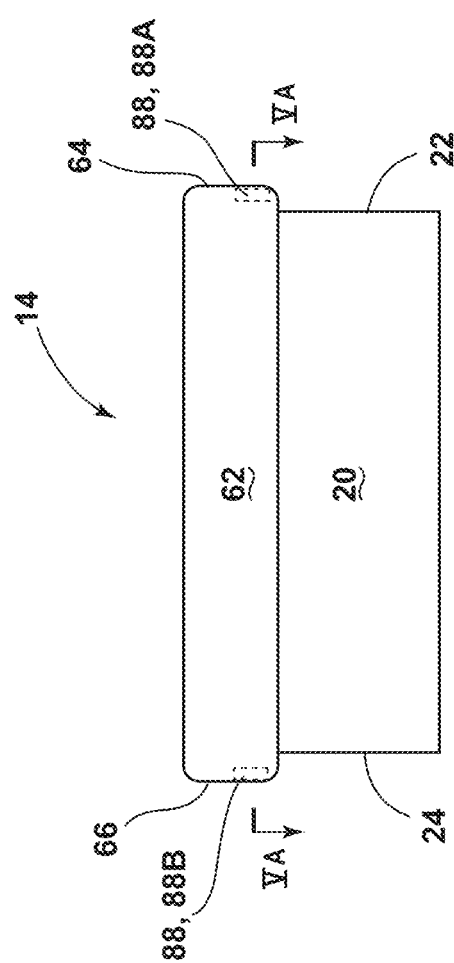
FIG. 5A is a side view of the storage box, illustrating the door of the storage box in the closed position and first and second actuators in unactuated positions, according to one embodiment.

Referring now to FIGS. 1-3, a vehicle 10 includes a vehicle interior 12. In various embodiments, the storage box 14 may be disposed in the vehicle interior 12. For example, the storage box 14 may be disposed between front and rear rows of seating 16, 18 within the vehicle interior 12, as illustrated in FIG. 1. The storage box 14 includes the base 20. The base 20 includes the first end 22 and the second end 24 that is opposite the first end 22. As illustrated in phantom in FIG. 2, the base 20 may have a receptacle 26 disposed therein. For example, the base 20 may define the receptacle 26, as shown in FIG. 2.

In various embodiments, the base 20 may include at least one striker feature 28. The base 20 may include a plurality of striker features 28. In some embodiments, the base 20 may include at least one first striker feature 28A that may be disposed generally proximate to the first end 22 of the base 20 and/or at least one second striker feature 28B that may be disposed generally proximate to the second end 24 of the base 20. For example, in the embodiment illustrated in FIG. 2, the base 20 includes two first striker features 28A disposed generally proximate to opposite side walls 30 of the base 20 proximate to the first end 22 of the base 20. As further illustrated in FIG. 2, the base 20 includes two second striker features 28B disposed generally proximate to opposite side walls 30 of the base 20 proximate to the second end 24 of the base 20. The at least one striker feature 28 may be configured to receive at least one pivot pin 72 therein, as described further herein.

The at least one striker feature 28 may include a contact surface 32 configured to contact the at least one pivot pin 72 during movement of the door 62 into the closed position and a receiving feature 34 configured to receive at least a portion of the at least one pivot pin 72 therein in the closed position of the door 62. In some embodiments, the at least one striker feature 28 may include at least one spring feature 36. The spring feature 36 may be coupled to and/or extend between the at least one striker feature 28 and the base 20 of the storage box 14. The spring feature 36 may be configured to resiliently deform to allow the at least one striker feature 28 to move relative to the base 20. In various implementations, the movement of the at least one striker feature 28 resulting from deformation of the spring feature 36 may amount to small adjustments in position relative to the base 20 of the storage box 14. In the embodiment illustrated in FIG. 7A, the base 20 includes four striker features 28, and each of the four striker features 28 include two spring features 36 that extend outward from each striker feature 28 in opposite directions.

Referring now to FIG. 3, an exemplary embodiment of the striker feature 28 is illustrated. In the illustrated embodiment, the striker feature 28 includes a floor 38, first and second side walls 40, 42 coupled to the floor 38, and a rear wall 44 disposed between the first and second side walls 40, 42 and coupled to the floor 38. The first and second side walls 40, 42 and the rear wall 44 extend upward from the floor 38 to an upper surface 46. A recess 48 is defined by the floor 38, the first and second side walls 40, 42, and the rear wall 44. The recess 48 begins at an interior edge 50 of the upper surface 46 and extends downward and to the floor 38 of the striker feature 28. Inner surfaces 52 of the first and second side walls 40, 42 slope from the interior edge 50 of the upper surface 46 downward and inboard toward the floor 38 for a portion of the distance between the upper surface 46 and the floor 38 and then extend downward to the floor 38, such that the floor 38 and the portion of the inner surfaces 52 proximate to the floor 38 are generally perpendicular. The shape of the recess 48 defined by the striker feature 28 is wider proximate to the upper surface 46 and narrower proximate to the floor 38 of the striker feature 28 due to the sloping of the inner surfaces 52 of the first and second side walls 40, 42. An aperture 54 is defined by the rear wall 44 of the striker feature 28 between the floor 38 and the upper surface 46. First and second resilient L-shaped members 56, 58 extend outward from outer surfaces 60 of the first and second side walls 40, 42, respectively.

In the embodiment illustrated in FIG. 3, the upper surface 46 of the rear wall 44 is configured as the contact surface 32 of the striker feature 28, the aperture 54 extending through the rear wall 44 is configured as the receiving feature 34 of the striker feature 28, and the first and second L-shaped members 56, 58 are configured as spring features 36 of the striker feature 28. As such, in the embodiment illustrated in FIG. 3, the upper surface 46 of the rear wall 44 is configured to contact the corresponding pivot pin 72 as the door 62 moves to the closed position, and the aperture 54 is configured to receive a portion of the pivot pin 72 when the door 62 is in the closed position. Further, the first and second L-shaped members 56, 58 are configured to extend from the first and second side walls 40, 42 to contact the base 20 of the storage box 14 and resiliently deform to allow the striker feature 28 to move relative to the base 20.

It is contemplated that, in various embodiments, the at least one striker feature 28 may include a variety of types of contact surfaces 32, receiving features 34, and/or spring features 36. For example, in some implementations, the receiving feature 34 may be at least one of a variety of features configured to receive the at least one pivot pin 72 (e.g., depression, cavity, groove, etc.). Further, in some implementations, the spring feature 36 may be at least one of a variety of features configured to resiliently deform to allow movement of the at least one striker feature 28 relative to the base 20 (e.g., a coil spring, an elastic band, a compressible serpentine member, etc.). In some embodiments, a portion of the base 20 may include the contact surface 32 configured to contact the at least one pivot pin 72 during movement of the door 62 into the closed position. It is further contemplated that, in some implementations, the at least one striker feature 28 may be defined by and/or integrally coupled with the base 20. Additionally, irrespective of the manner that the at least one striker feature 28 is coupled to the base 20, the at least one pivot pin 72 may be configured to contact and/or be engaged with the base 20 via contact and/or engagement with the at least one striker feature 28.

Figure 7A:
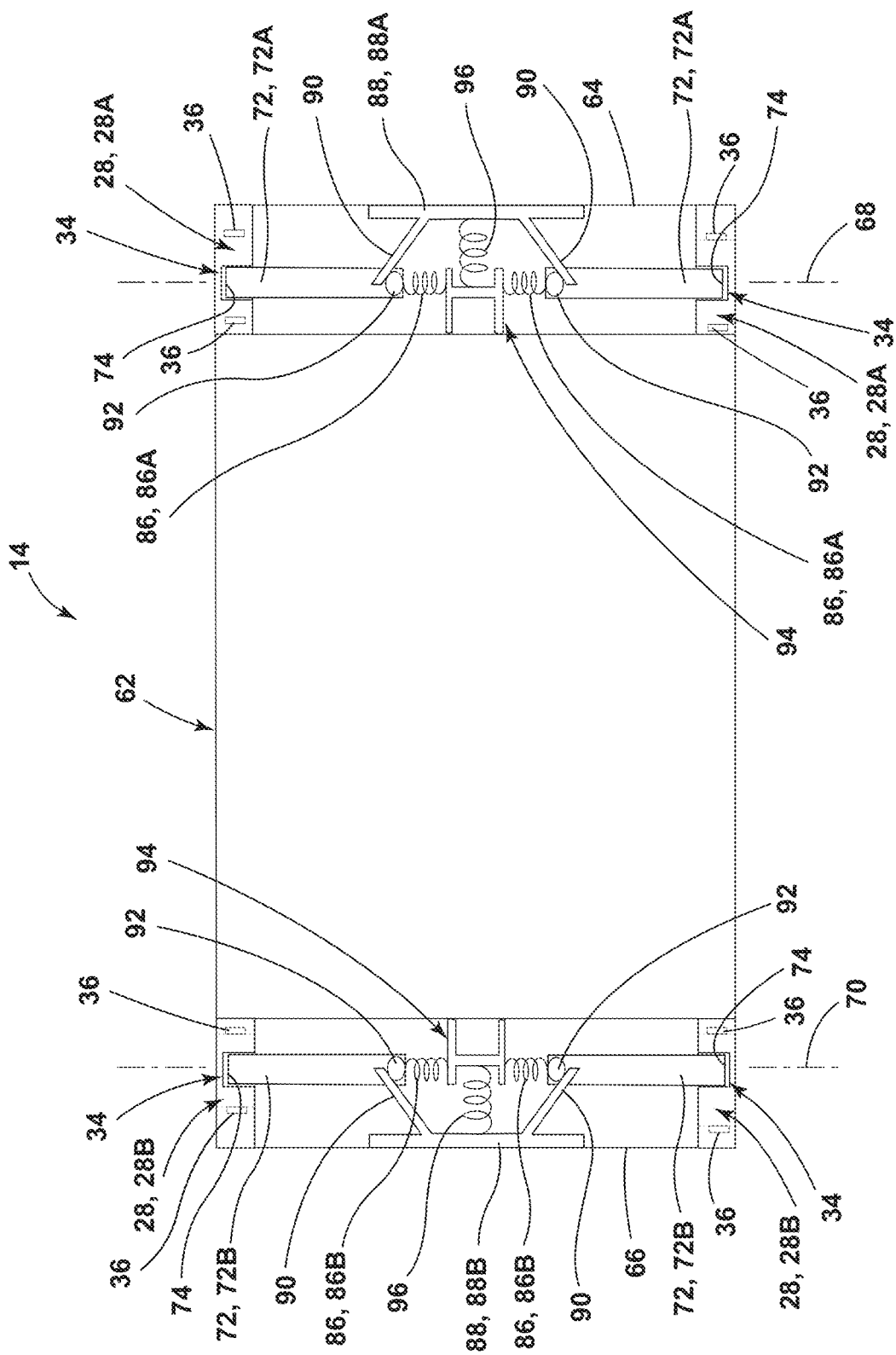
FIG. 7A is a cross-sectional view of the door of the storage box taken through line VA-VA in FIG. 5A, illustrating the first and second pivot pins in engaged positions and the first and second actuators in the unactuated positions, according to one embodiment.
Figure 7B:
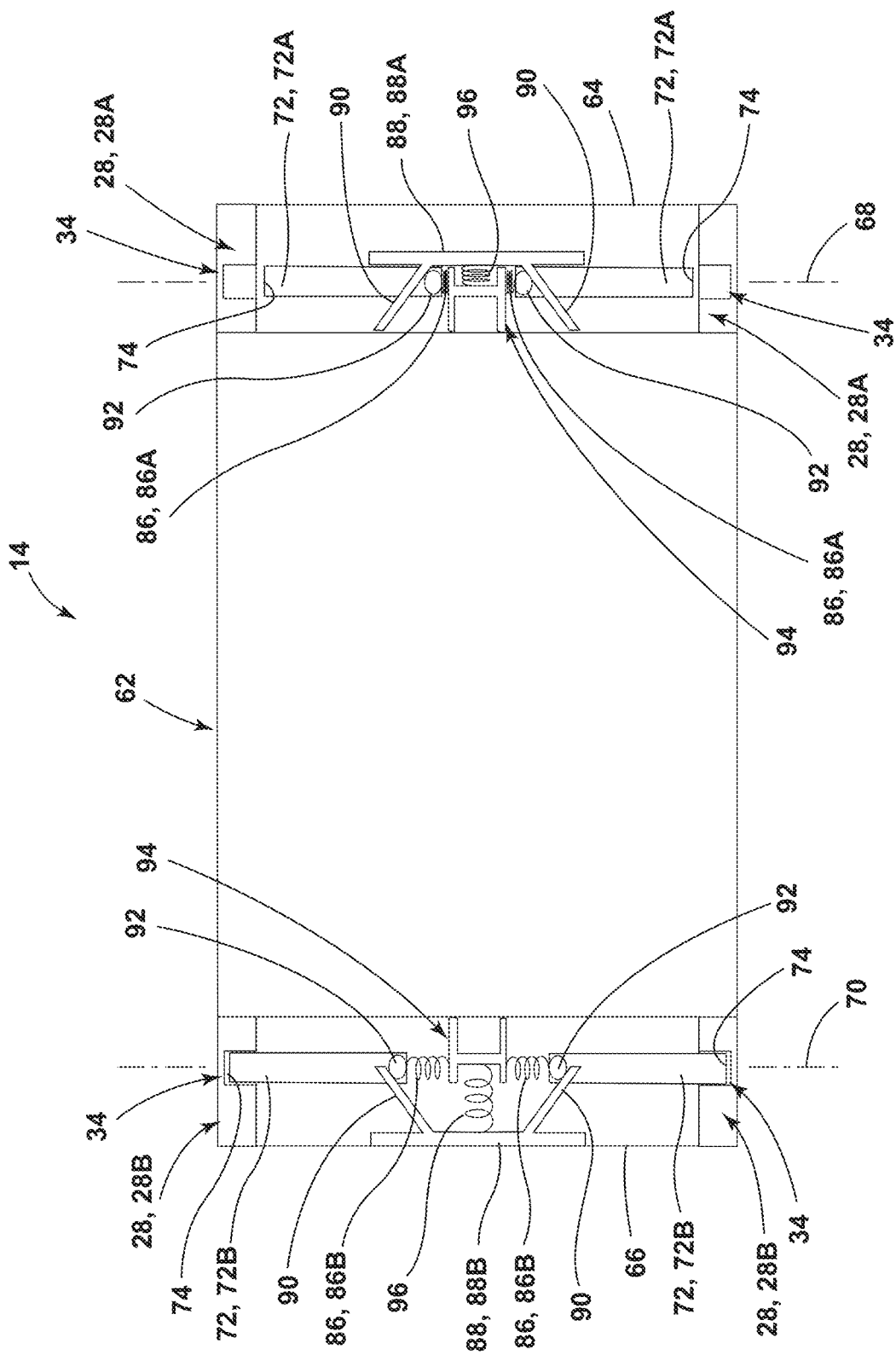
FIG. 7B is a cross-sectional view of the door of the storage box taken through line VIA-VIA in FIG. 6A, illustrating the first pivot pins in disengaged positions and the second pivot pins in engaged positions, according to one embodiment.

Referring now to FIGS. 2, 7A, and 7B, in various embodiments, the base 20 may include one or more corresponding pairs of striker features 28. For example, as illustrated in FIG. 2, the base 20 may include the pair of corresponding first striker features 28A, and the pair of corresponding second striker features 28B. In various embodiments corresponding striker features 28 may be positioned relative to the base 20 to generally face each other. In an exemplary embodiment, in which the two first striker features 28A and two second striker features 28B each comprise the embodiment of the striker feature 28 illustrated in FIG. 3, the recess-defining surfaces of the rear walls 44 of the first striker features 28 may generally face each other, such that the respective recesses 48 of the two first striker features 28A are disposed nearer to each other than the rear walls 44 of the two first striker features 28A. The pair of second striker features 28B may be similarly oriented relative to each other. In these orientations, the receiving features 34 of the corresponding striker features 28 are generally aligned, such that a first pivot axis 68 may extend through the receiving features 34 of the first striker features 28A and a second pivot axis 70 may extend through the receiving features 34 of the second striker features 28B, as illustrated in FIGS. 7A and 7B and discussed further herein. In some embodiments, one of the striker features 28 in each corresponding pair of striker features 28 may include the spring feature 36, and the spring feature 26 may allow the striker feature 28 to move relative to the base 20 in a direction perpendicular to the first pivot axis 68 and/or the second pivot axis 70.

Referring now to FIGS. 1, 2, and 4A-4C, the door 62 is operably coupled to the base 20. The door 62 includes the first end 64 and the second end 66 opposite the first end 64. In various embodiments, the door 62 may be operable between the closed position, as illustrated in FIGS. 1, 2, and 4A, the first open position, illustrated in FIG. 4B, and the second open position, illustrated in FIG. 4C. The door 62 may be configured to pivot from the closed position to the first open position in a first direction and may be configured to pivot from the closed position to the second open position in a second direction that is opposite the first direction. In various embodiments, the door 62 may be configured to pivot about the first pivot axis 68, which is depicted in FIG. 2, while moving between the closed position and the first open position. The door 62 may be configured to pivot about the second pivot axis 70, which is shown in FIG. 2 as being generally proximate to the second end 24 of the base 20, while the door 62 is pivoting between the closed position and the second open position. In the closed position, the first end 64 of the door 62 may correspond with the first end 22 of the base 20, and the second end 66 of the door 62 may correspond with the second end 24 of the base 20. In other words, in the closed position, the first end 64 of the door 62 may be proximate to the first end 22 of the base 20, and the second end 66 of the door 62 may be proximate to the second end 24 of the base 20.

Referring now to FIGS. 2 and 5A-8, at least one pivot pin 72 may be coupled to the door 62. In some embodiments, at least one first pivot pin 72A may be coupled to the door 62 generally proximate to the first end 64 of the door 62, and/or at least one second pivot pin 72B may be coupled to the door 62 generally proximate to the second end 66 of the door 62. For example, in some embodiments, two first pivot pins 72A may be coupled to the door 62 proximate to the first end 64 of the door 62, and two second pivot pins 72B may be coupled to the door 62 proximate to the second end 66 of the door 62, as illustrated in FIGS. 2, 7A, and 7B.

Figure 8:
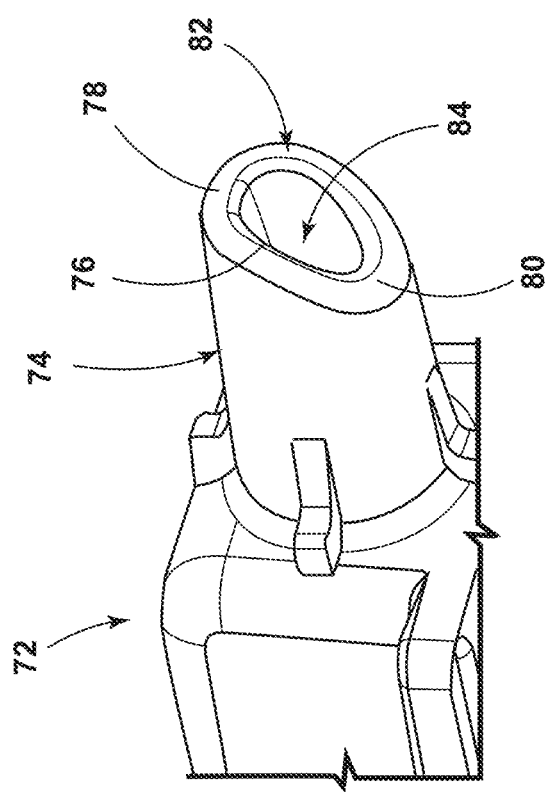
FIG. 8 is a perspective view of an end portion of the pivot pin, illustrating a contact surface, according to one embodiment.
Figure 9A:
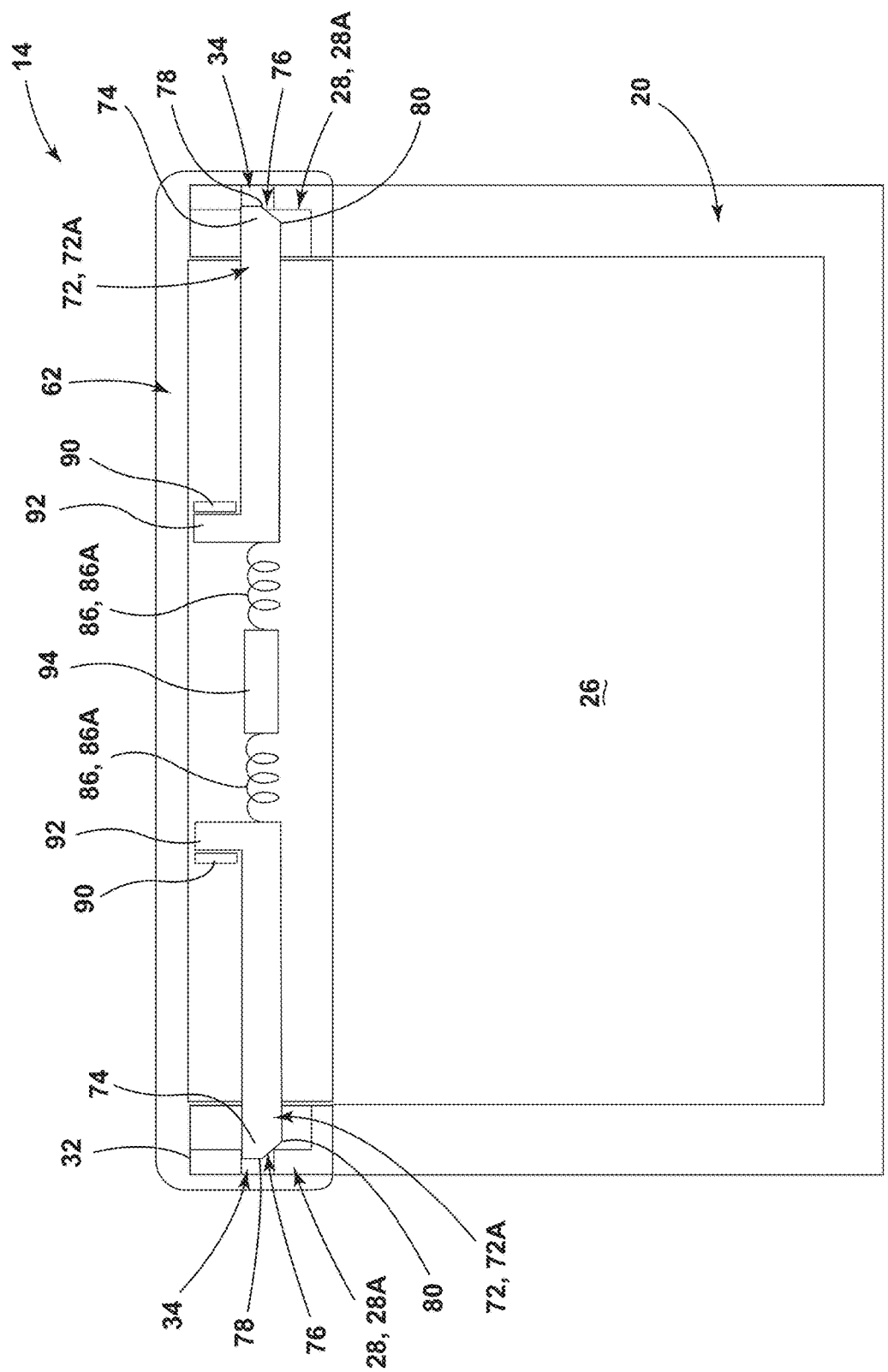
FIG. 9A is a cross-sectional view of the storage box taken through line the VB-VB in FIG. 5B, illustrating the first pivot pins engaged with a base of the storage box, according to one embodiment.

Referring now to FIGS. 8 and 9A, in various embodiments, the at least one pivot pin 72 may include an end portion 74. As described further herein, the end portion 74 may be configured to be engaged with the base 20 and/or the at least one striker feature 28. In various embodiments, the end portion 74 may include a contact surface 76. The contact surface 76 of the end portion 74 may be configured to contact the contact surface 32 of the at least one striker feature 28 and/or the base 20 in movement of the door 62 to the closed position. The contact surface 76 of the end portion 74 may extend at an angle relative to the direction of extension of the pivot pin 72 from an outward-most portion 78 to an inward-most portion 80. For example, as illustrated in FIG. 8, the contact surface 76 of the end portion 74 is a generally circular rim 82 that extends at an angle from the outward-most portion 78 to the inward-most portion 80. In the depicted embodiment, the rim 82 surrounds a hollow 84 defined by the end portion 74. It is contemplated that the contact surface 76 of the end portion 74 may be a variety of types of surfaces, in various embodiments. For example, the contact surface 76 may be a generally flat, angled surface, as illustrated in FIG. 9A, as opposed to the rim 82 shown in FIG. 8. It is further contemplated that, in some embodiments, the contact surface 76 may not be angled from the inward-most portion 80 to the outward-most portion 78.

In various embodiments, the at least one pivot pin 72 may be operable between engaged and disengaged positions. The at least one pivot pin 72 may be rotatably engaged with the base 20 while in the engaged position. In some embodiments, the at least one pivot pin 72 may be engaged with the at least one striker feature 28 coupled to the base 20 while in the engaged position. In some examples, the end portion 74 of the at least one pivot pin 72 may be configured to be engaged with the base 20 and/or the at least one striker feature 28 when the at least one pivot pin 72 is in the engaged position. For example, the end portion 74 may be configured to be received by the receiving feature 34 of the at least one striker feature 28, such that the end portion 74 may rotate relative to and/or within the receiving feature 34 while the at least one pivot pin 72 is in the engaged position.

In various embodiments, the at least one pivot pin 72 may be disengaged from the base 20 while in the disengaged position. In some embodiments, the end portion 74 of the at least one pivot pin 72 may be disengaged from the base 20 when the at least one pivot pin 72 is in the disengaged position. In some embodiments, the end portion 74 of the at least one pivot pin 72 may be disengaged from the base 20 and/or the at least one striker feature 28 while in the disengaged position. For example, the end portion 74 may be disengaged from the receiving feature 34 of the at least one striker feature 28 in the disengaged position.

In some embodiments, in which the door 62 includes at least one first pivot pin 72A and at least one second pivot pin 72B, the at least one first pivot pin 72A may be configured to be rotatably engaged with the base 20 and/or the at least one first striker feature 28A proximate to the first end 22 of the base 20 in the engaged position. Similarly, the at least one second pivot pin 72B may be configured to be rotatably engaged with the base 20 and/or the at least one second striker feature 28B proximate to the second end 24 of the base 20 in the engaged position. In various embodiments, the at least one first striker feature 28A may be configured to receive the at least one first pivot pin 72A therein as the at least one first pivot pin 72A enters the engaged position, such that the at least one first pivot pin 72A is configured to be rotatably engaged with the at least one first striker feature 28A. For example, as shown in FIG. 9A, the receiving feature 34 of the at least one first striker feature 28A may be configured to receive at least a portion of the end portion 74 of the at least one first pivot pin 72A therein, such that the at least one first pivot pin 72A is engaged with the at least one first striker feature 28A and rotatable within the receiving feature 34.

Referring now to FIGS. 2 and 4A-4C, in various embodiments, the at least one first pivot pin 72A and the at least one second pivot pin 72B may be in the engaged positions if the door 62 is in the closed position, as shown in FIG. 4A. In some embodiments, the at least one first pivot pin 72A may be in the engaged position and the at least one second pivot pin 72B may be in the disengaged position if the door 62 is in the first open position, as shown in FIG. 4B. In some embodiments, the at least one second pivot pin 72B may be in the engaged position and the at least one first pivot pin 72A may be in the disengaged position if the door 62 is in the second open position, as shown in FIG. 4C.

Referring now to FIGS. 2 and 5A-7B, in various embodiments, the door 62 may include one or more biasing features 86. In some embodiments, the door 62 may include one or more first biasing features 86A and/or one or more second biasing features 86B. For example, as shown in FIGS. 7A and 7B, in some embodiments, the door 62 may include two first biasing features 86A and two second biasing features 86B. The one or more biasing features 86 may be configured to bias the at least one pivot pin 72 in a door-outboard direction. For example, as illustrated in FIGS. 7A and 7B, the two first biasing features 86A may be respectively coupled to the two first pivot pins 72A and may be configured to bias the two first pivot pins 72A in respective door-outboard directions. Similarly, the two second biasing features 86B may be respectively coupled to the two second pivot pins 72B and may be configured to bias the second pivot pins 72B in respective door-outboard directions. The door-outboard directions may generally align with the pivot axes 68, 70 that the door 62 is configured to pivot about. For example, the first biasing features 86A may bias the first pivot pins 72A in opposite door-outboard directions generally parallel to the direction of extension of the first pivot axis 68. Similarly, the second biasing features 86B may bias the second pivot pins 72B in opposite door-outboard directions generally parallel to the direction of extension of the second pivot axis 70. In various embodiments, the directions of extension of the first and second pivot axes 68, 70 are parallel to each other and/or to the directions of extension of the first and second pivot pins 72A, 72B.

The one or more biasing features 86 may be configured to yieldingly bias the at least one pivot pin 72 in the door-outboard direction to yieldingly maintain the at least one pivot pin 72 in the engaged position relative to the base 20 of the storage box 14. It is contemplated that the one or more biasing features 86 may include at least one of a variety of features configured to bias the at least one pivot pin 72 in the door-outboard direction (e.g., springs, bands, pistons, integrally coupled resilient members, etc.).

Referring still to FIGS. 2 and 5A-7B, in various embodiments, one or more actuators 88 may be coupled to the door 62. For example, in some embodiments, a first actuator 88A may be coupled to the door 62, and a second actuator 88B may be coupled to the door 62. The first actuator 88A may be coupled to the door 62 generally proximate to the first end 64 of the door 62. The second actuator 88B may be coupled to the door 62 generally proximate to the second end 66 of the door 62. The one or more actuators 88 may be operable between actuated and unactuated positions. In various embodiments, movement of the one or more actuators 88 from the unactuated position to the actuated position may move the at least one pivot pin 72 door-inboard against the bias of the one or more biasing features 86. As such, movement of the one or more actuators 88 from the unactuated position to the actuated position may cause the at least one pivot pin 72 to move from the engaged position to the disengaged position.

Referring now to FIGS. 7A and 7B, the embodiments of the storage box 14 depicted shows a first actuator 88A disposed proximate to the first end 64 of the door 62 and a second actuator 88B disposed proximate to the second end 66 of the door 62. Guide features 90 extend from the first actuator 88A into the door 62 at angles relative to the first and second pivot axes 68, 70, and posts 92 extend door-upward from the first pivot pins 72A. Contact between the posts 92 and the guide features 90 of the first actuator 88A prompts the two first pivot pins 72A to move door-inboard against the bias of the first biasing features 86A as the first actuator 88A is moved from the unactuated position (shown in FIG. 7A) to the actuated position (shown in FIG. 7B). The angle of incidence between the guide features 90 and the posts 92 causes the posts 92 and the attached pivot pins 72 to move door-inboard as the first actuator 88A moves toward the actuated position. As shown in FIGS. 7A and 7B, the door 62 includes a bracing feature 94 disposed between the two first biasing features 86A. The bracing feature 94 is configured to brace against the first biasing features 86A to provide a backstop against which the two biasing features 86 may rebound. An actuator biasing feature 96 is coupled to the first actuator 88A and is configured to yieldingly contact the bracing feature 94 to bias the first actuator 88A toward the unactuated position.

It is contemplated that the one or more actuators 88 may be one or more of a variety of features configured to move the at least one pivot pin 72 door-inboard, in various embodiments. Further, it is contemplated that the first actuator 88A may be operable to remain in the unactuated position during movement of the door 62 from the second open position to the closed position. Further, in some embodiments, the second actuator 88B may be operable to remain in the unactuated position during movement of the door 62 from the first open position to the closed position.

Referring now to FIGS. 4A-4C, 7A, 7B, and 9A-13, in operation of an exemplary embodiment of the storage box 14, the door 62 of the storage box 14 is initially in the closed position, as illustrated in FIG. 4A. In the closed position, the two first pivot pins 72A are received within the receiving features 34 of the corresponding first striker features 28A, such that the two first pivot pins 72A are in the engaged positions. Likewise, in the closed position, the two second pivot pins 72B are in the engaged positions, received within the receiving features 34 of the corresponding second striker features 28B, as illustrated in FIG. 7A.

Figure 6B:
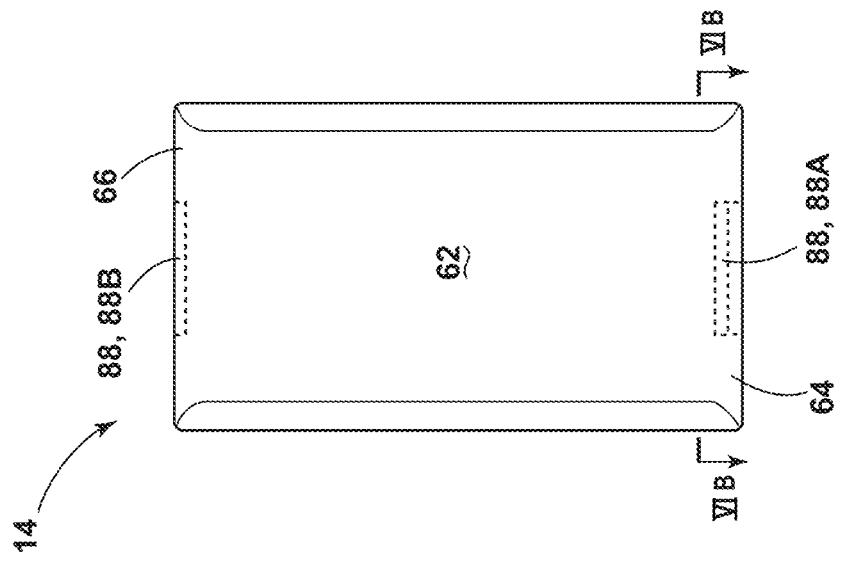
FIG. 6B is a top view of the storage box, illustrating the first actuator in an actuated position and the second actuator in the unactuated position, according to one embodiment.
Figure 6A:
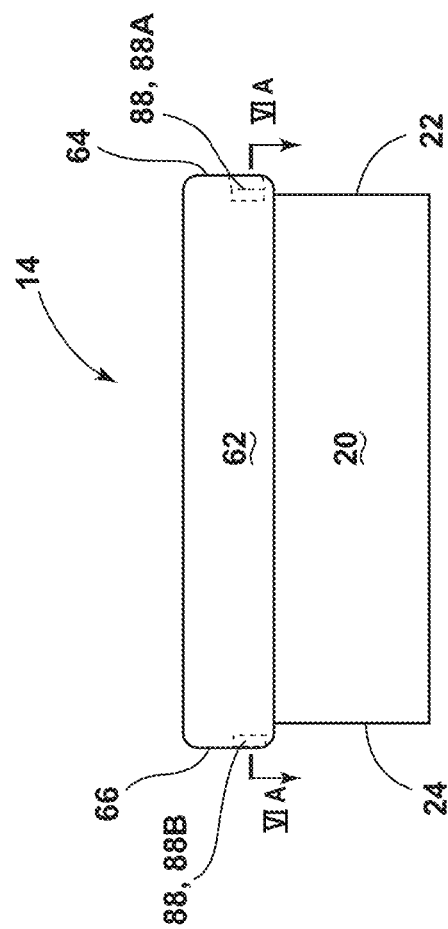
FIG. 6A is a side view of the storage box, illustrating the first actuator in an actuated position and the second actuator in the unactuated position, according to one embodiment.
Figure 9B:
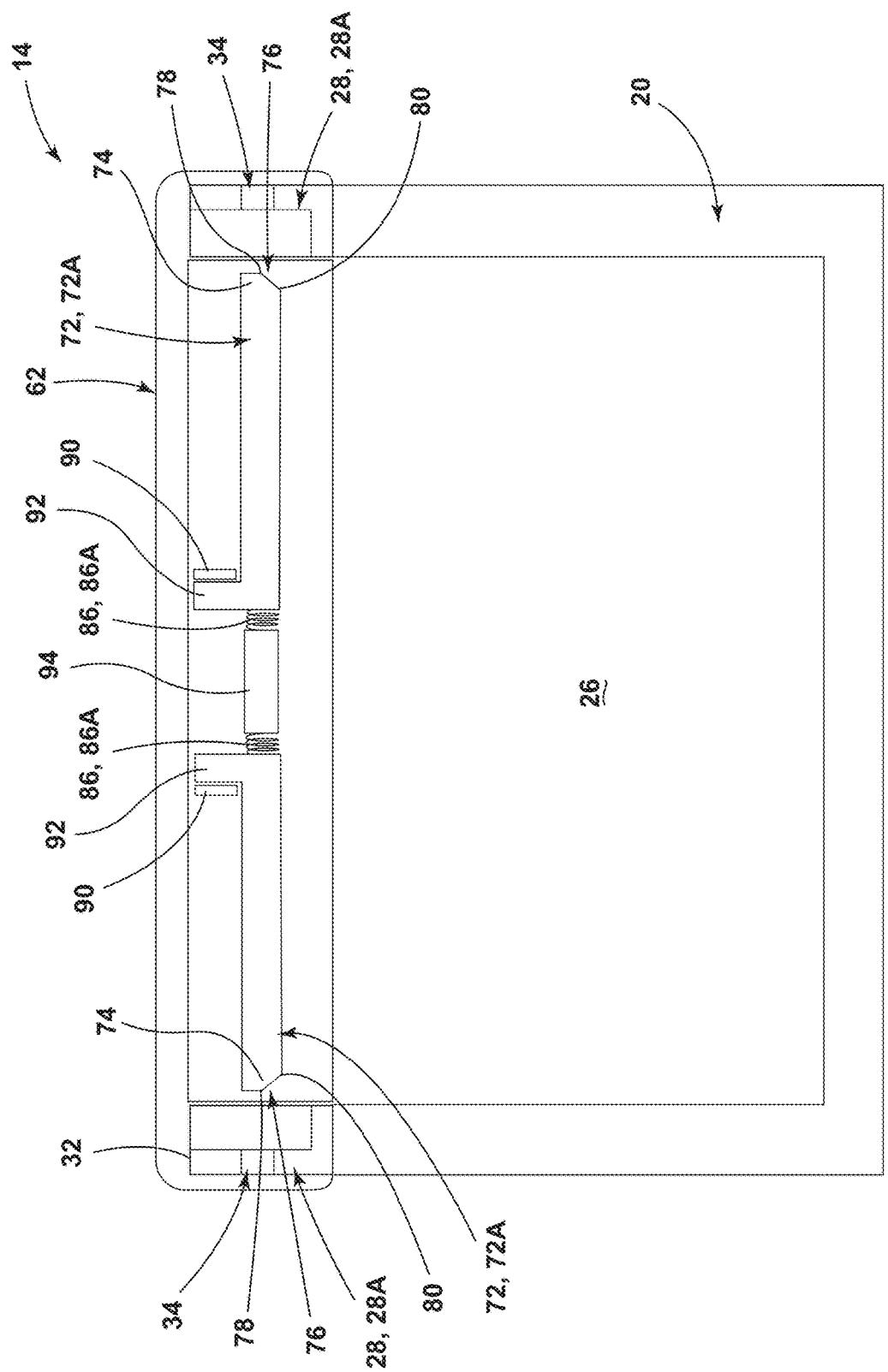
FIG. 9B is a cross-sectional view taken through line VIB-VIB in FIG. 6B, illustrating the first pivot pins in the disengaged positions, according to one embodiment.
Figure 10:
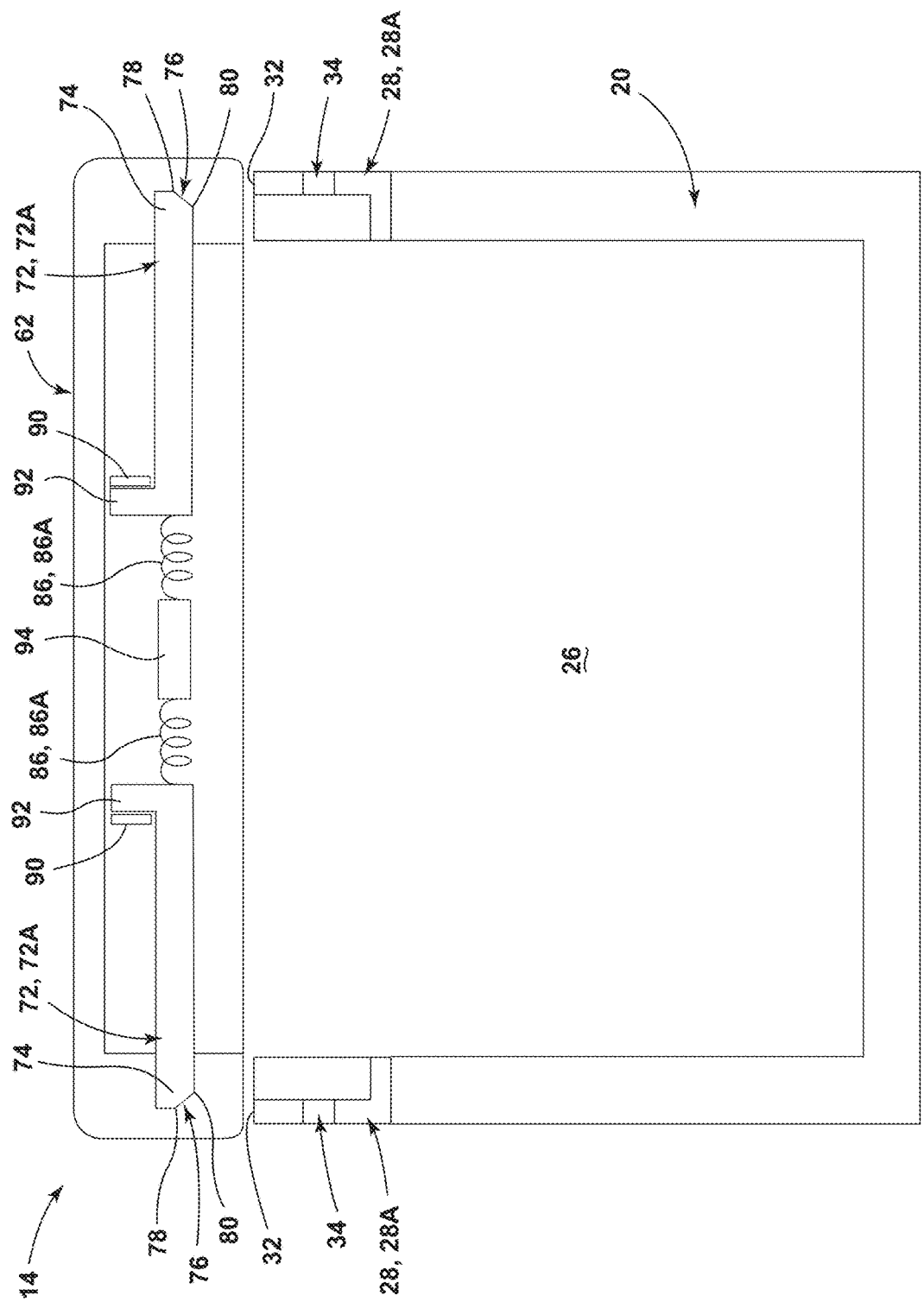
FIG. 10 is a cross-sectional view of the storage box, illustrating the door in the second open position, according to one embodiment.

Next, a user actuates the first actuator 88A, as illustrated in FIGS. 6B and 7B, which causes the first pivot pins 72A to move toward each other in respective door-inboard directions. This movement causes the first pivot pins 72A to egress from the receiving features 34 of the first striker features 28A, such that the first pivot pins 72A enter the disengaged positions, as illustrated in FIGS. 7B and 9B. The user then moves the door 62 to the second open position, shown in FIG. 4C, by pivoting the door 62 about the second pivot axis 70 via rotation of the two second pivot pins 72B within the receiving features 34 of the corresponding second striker features 28B. While the door 62 is in the second open position, the user releases the first actuator 88A. This allows the first actuator 88A to return to the unactuated position and the two first pivot pins 72A to move away from each other in respective door-outboard directions in accordance with the bias applied by the corresponding first biasing features 86A, as illustrated in FIG. 10.

Figure 11:
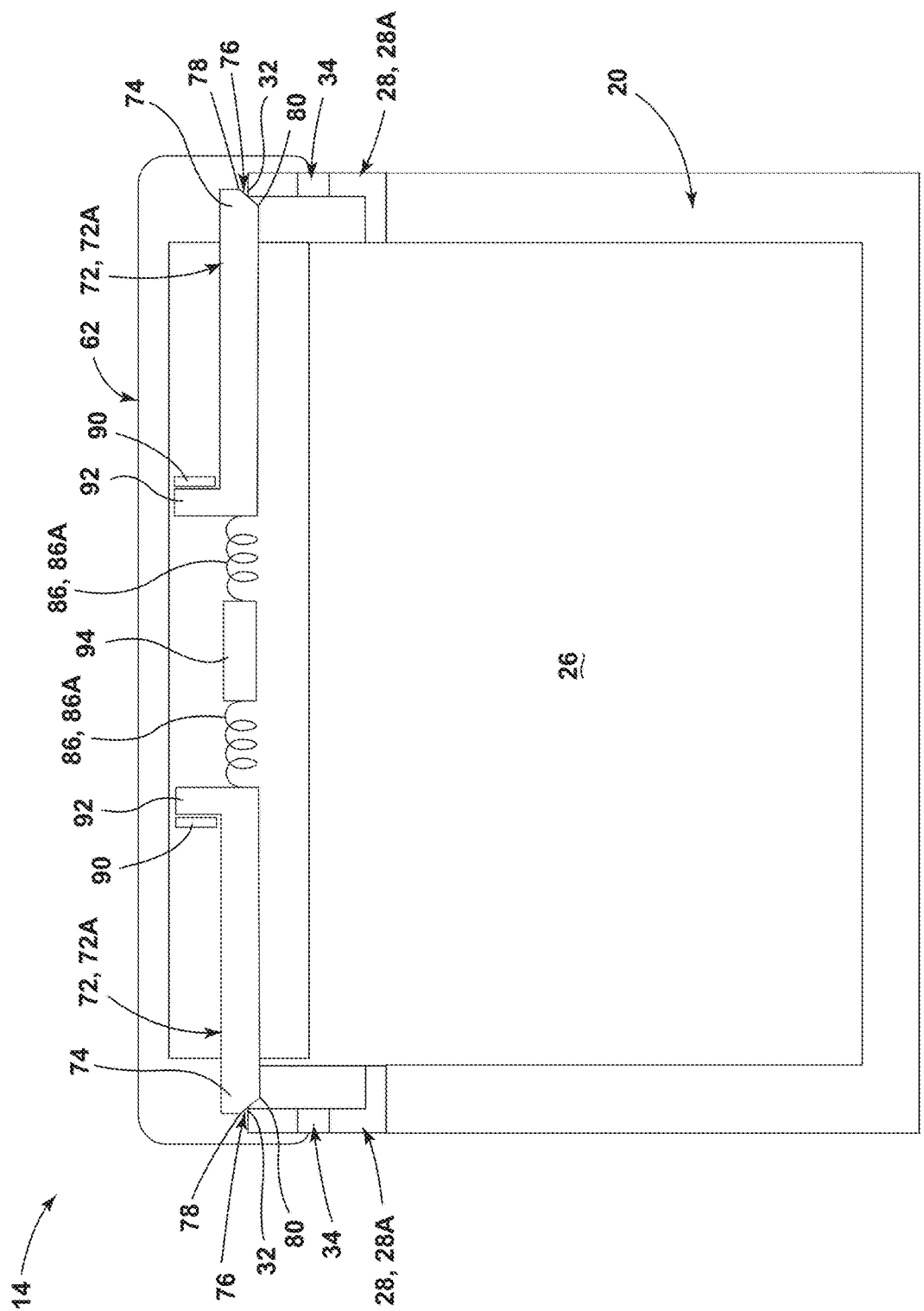
FIG. 11 is a cross-sectional view of the storage box, illustrating the contact surfaces of the end portions of the first pivot pins in contact with the base of the storage box, according to one embodiment.
Figure 12:
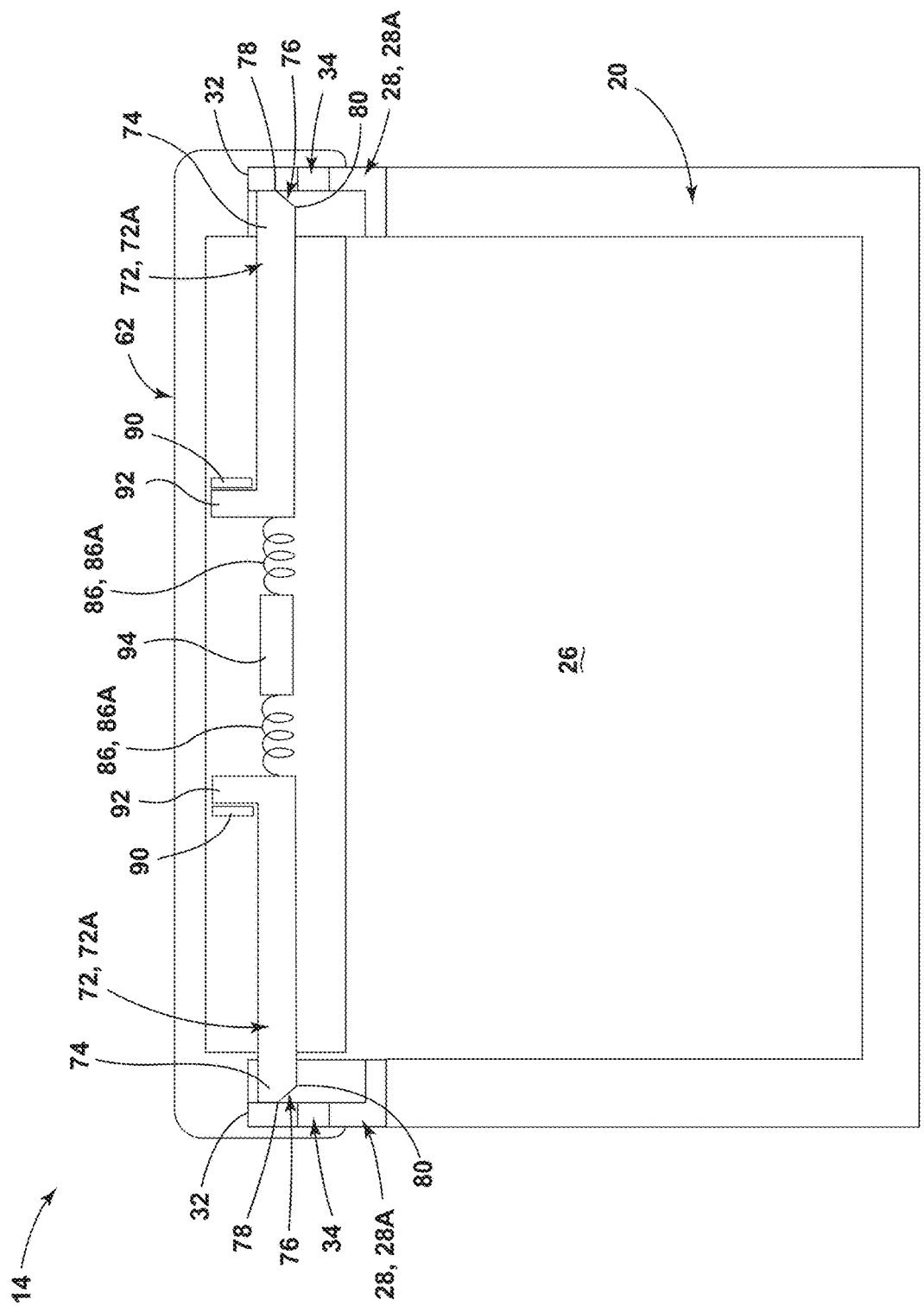
FIG. 12 is a cross-sectional view of the storage box, illustrating the first pivot pins in contact with the base, according to one embodiment.
Figure 13:
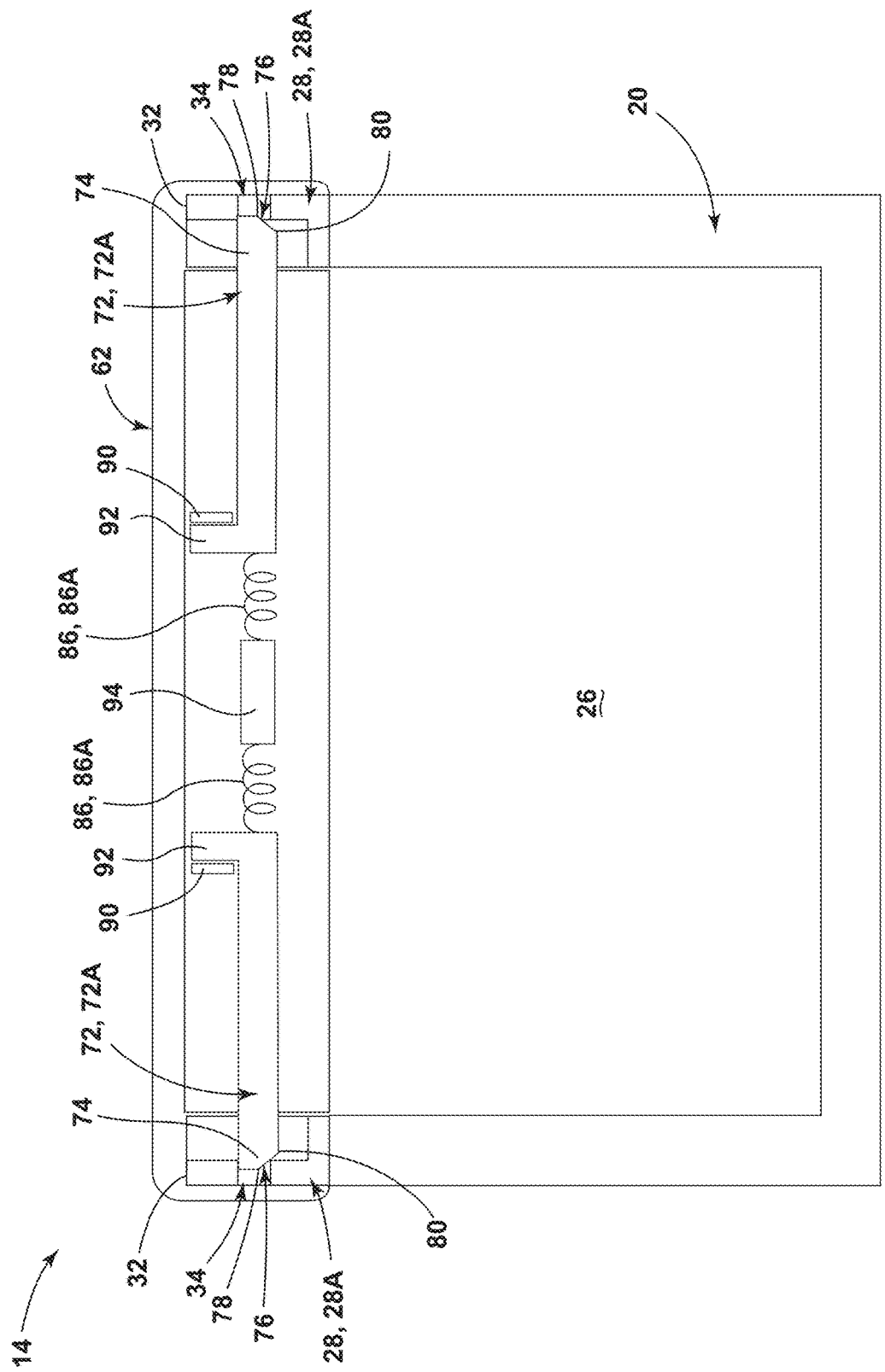
FIG. 13 is a cross-sectional view of the storage box, illustrating the first pivot pins in the engaged positions, according to one embodiment.

Next, the user moves the door 62 from the second open position toward the closed position by pivoting the door 62 about the second pivot axis 70. As the door 62 approaches the closed position, the contact surfaces 76 of the two first pivot pins 72A contact the contact surfaces 32 of the two corresponding first striker features 28A, as illustrated in FIG. 11. The angles of incidence between the contact surfaces 76 of the two first pivot pins 72A and the contact surfaces 32 of the two first striker features 28A cause the two first pivot pins 72A to move toward each other in respective door-inboard directions as the door 62 moves nearer to the closed position, as illustrated in FIG. 12. As the door 62 reaches the closed position, the two first pivot pins 72A align with the respective receiving features 34 of the two first striker features 28A, and the first biasing features 86A prompt the two first pivot pins 72A to move away from each other in respective door-outboard directions into the receiving features 34, as illustrated in FIG. 13. This movement causes the two first pivot pins 72A to enter the engaged positions as the door 62 enters the closed position.

Next, the user actuates the second actuator 88B, which causes the two second pivot pins 72B to move toward each other in respective door-inboard directions. This movement causes the second pivot pins 72B to egress from the receiving features 34 of the corresponding second striker features 28B, such that the second pivot pins 72B enter the disengaged positions. The user then moves the door 62 to the first open position, shown in FIG. 4B, by pivoting the door 62 about the first pivot axis 68 via rotation of the two first pivot pins 72A within the receiving features 34 of the corresponding first striker features 28A. While the door 62 is in the first open position, the user releases the second actuator 88B. This allows the second actuator 88B to return to the unactuated position and the two second pivot pins 72B to move away from each other in respective door-outboard directions due to the biases exerted by the corresponding second biasing features 86B.

Finally, the user moves the door 62 from the first open position toward the closed position by pivoting the door 62 about the first pivot axis 68. As the door 62 approaches the closed position, the contact surfaces 76 of the two second pivot pins 72B contact the contact surfaces 32 of the two second striker features 28B. The angles of incidence between the contact surfaces 76 of the two second pivot pins 72B and the contact surfaces 32 of the two second striker features 28B cause the two second pivot pins 72B to move toward each other in respective door-inboard directions as the door 62 moves nearer to the closed position. As the door 62 reaches the closed position, the two second pivot pins 72B align with the respective receiving features 34 of the two second striker features 28B, and the second biasing features 86B prompt the two second pivot pins 72B to move away from each other in respective door-outboard directions into the receiving features 34. This movement causes the two second pivot pins 72B to enter the engaged positions as the door 62 enters the closed position.

Referring now to FIGS. 11-13, in some embodiments, in the closed position of the door 62, the contact surface 76 of the end portion 74 of the at least one pivot pin 72 may extend door-downward and door-inboard from the outward-most portion 78 to the inward-most portion 80. For example, as illustrated in FIG. 13, the contact surfaces 76 of the end portion 74 of the two first pivot pins 72A both extend door-downward and door-inboard from the respective outward-most portions 78 to the respective inward-most portions 80. As illustrated in FIGS. 11 and 12, the contact surfaces 76 of the first pivot pins 72A are angled relative to the contact surfaces 32 of the first striker features 28A, such that the angles of incidence between the contact surfaces 76 of the first pivot pins 72A and contact surfaces 32 of the corresponding first striker features 28A cause the first pivot pins 72A to move door-inboard toward each other as the door 62 moves toward the closed position. However, it is contemplated that, in some embodiments, the contact surface 32 of the at least one striker feature 28 may be angled in addition to, or instead of, the contact surface 76 of the at least one pivot pin 72. For example, in some embodiments, the contact surfaces 32 of the first striker features 28A may be angled base-downward and base-inboard, such that the first pivot pins 72A are forced progressively further door-inboard as the door 62 moves nearer to the closed position due to contact with the angled contact surfaces 32 of the first striker features 28A. As such, in some embodiments, the at least one pivot pin 72 may move door-inboard as the door 62 moves toward the closed position due to the angle of incidence between the at least one pivot pin 72 and the at least one striker feature 28 on account of the angle of the contact surface 76 of the at least one pivot pin 72 and/or the angle of the contact surface 32 of the at least one striker feature 28.

The present disclosure may provide a variety of advantages. First, having pairs of first and second pivot pins 72A, 72B operable to pivot relative to the base 20 and disengage from the base 20 allows the door 62 to open in two directions. Second, the first and second pivot pins 72A, 72B being operable to enter the engaged positions due to contact with the corresponding first and second striker features 28A, 28B, as the door 62 is closed, allows the door 62 to open and close without an additional frame typically necessary for bi-directionally opening doors. Third, having one or more spring features 36 coupling at least one striker feature 28 to the base 20 may allow the at least one striker feature 28 to move slightly relative to the base 20, which may aid in accounting for dimensional tolerances in various components of the storage box 14 that may result from a storage box 14 with a bi-directionally openable door 62 operating without a conventional frame.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A storage box for a vehicle, comprising:
   a base having a receptacle, a first end, and a second end opposite the first end;
   a door operably coupled to the base and having a first end and a second end opposite the first end;
   a first pivot pin coupled to the door generally proximate to the first end of the door and operable between an engaged position, wherein the first pivot pin is rotatably engaged with the base proximate to the first end of the base, and a disengaged position, wherein the first pivot pin is disengaged from the base;
   a first biasing feature coupled to the first pivot pin and configured to bias the first pivot pin in a door-outboard direction;
   a second pivot pin coupled to the door generally proximate to the second end of the door and operable between an engaged position, wherein the second pivot pin is rotatably engaged with the base proximate to the second end of the base, and a disengaged position, wherein the second pivot pin is disengaged from the base;
   a second biasing feature coupled to the second pivot pin and configured to bias the second pivot pin in a door-outboard direction;
   wherein the door is operable between a closed position, wherein the first and second pivot pins are in the engaged positions, a first open position, wherein the first pivot pin is in the engaged position and the second pivot pin is in the disengaged position, and a second open position, wherein the second pivot pin is in the engaged position and the first pivot pin is in the disengaged position;
   a first actuator coupled to the door and operable between an actuated position and an unactuated position, wherein movement of the first actuator from the unactuated position to the actuated position is configured to move the first pivot pin door-inboard against the bias of the first biasing feature; and
   a second actuator coupled to the door and operable between an actuated position and an unactuated position, wherein movement of the second actuator from the unactuated position to the actuated position is configured to move the second pivot pin door-inboard against the bias of the second biasing feature, wherein the first actuator is operable to remain in the unactuated position during movement of the door from the second open position to the closed position, and the second actuator is operable to remain in the unactuated position during movement of the door from the first open position to the closed position;
   wherein as the door moves from the second open position to the closed position, the first pivot pin is configured to sequentially:
      contact the base;
      move door-inboard against the bias of the first biasing feature due to an angle of incidence between the base and the first pivot pin; and
      move door-outboard due to the bias of the first biasing feature to the engaged position; and wherein as the door moves from the first open position to the closed position, the second pivot pin is configured to sequentially:

contact the base;

move door-inboard against the bias of the second biasing feature due to an angle of incidence between the base and the second pivot pin; and move door-outboard due to the bias of the second biasing feature to the engaged position.

2. The storage box of claim 1, wherein the base comprises:

a first striker feature disposed generally proximate to the first end of the base and configured to receive the first pivot pin therein as the first pivot pin enters the engaged position, such that the first pivot pin is configured to be rotatably engaged with the first striker feature; and a second striker feature disposed generally proximate to the second end of the base and configured to receive the second pivot pin therein as the second pivot pin enters the engaged position, such that the second pivot pin is configured to be rotatably engaged with the second striker feature.

3. The storage box of claim 2, wherein the first pivot pin is configured to move door-inboard against the bias of the first biasing feature due to the angle of incidence between a contact surface of the first striker feature of the base contacting the first pivot pin as the door moves from the second open position to the closed position, and the second pivot pin is configured to move door-inboard against the bias of the second biasing feature due to the angle of incidence between a contact surface of the second striker feature of the base contacting the second pivot pin as the door moves from the first open position to the closed position.

4. The storage box of claim 2, wherein the first and second striker features are integrally coupled with the base.

5. The storage box of claim 1, wherein the first pivot pin comprises:

an end portion configured to be rotatably engaged with the base in the engaged position of the first pivot pin and having a contact surface that extends from an outward-most portion to an inward-most portion, wherein the contact surface extends door-downward and door-inboard from the outward-most portion to the inward-most portion in the closed position of the door.

6. The storage box of claim 5, wherein the first pivot pin is configured to move door-inboard as the door moves from the second open position toward the closed position due to the angle of incidence between the base and the contact surface of the end portion.

7. The storage box of claim 1, wherein the door is configured to pivot from the closed position to the first open position in a first direction and is configured to pivot from the closed position to the second open position in a second direction that is opposite the first direction.

8. A storage box, comprising:

a door coupled to a base;

a pivot pin coupled to the door and operable between an engaged position, wherein the pivot pin is rotatably engaged with the base, and a disengaged position, the pivot pin being configured to move door-inboard due to contact with the base as the pivot pin moves from the disengaged position to the engaged position; and an actuator coupled to the door and operable between an actuated position and an unactuated position, wherein movement of the actuator from the unactuated position to the actuated position is configured to move the pivot pin from the engaged position to the disengaged position, and wherein the actuator is operable to return to the unactuated position while the pivot pin remains in the disengaged position, and the actuator is operable to remain in the unactuated position as the pivot pin subsequently returns to the engaged position.

9. The storage box of claim 8, wherein the pivot pin is configured to move door-outboard to enter the engaged position.

10. The storage box of claim 9, wherein the door is configured to pivot between a first open position, wherein the pivot pin is in the disengaged position, and a closed position, wherein the pivot pin is in the engaged position.

11. The storage box of claim 10, wherein the door is configured to pivot between a second open position and the closed position while the pivot pin is in the engaged position via rotation of the pivot pin.

12. The storage box of claim 11, wherein the door is configured to pivot from the closed position to the first open position in a first direction and is configured to pivot from the closed position to the second open position in a second direction that is opposite the first direction.

13. A storage box, comprising:

a base;

a striker feature having a contact surface, a receiving feature, and a spring feature that is configured to resiliently deform to allow the striker feature to move relative to the base;

a door pivotably coupled to the base and operable to pivot between an open position and a closed position; and a pin coupled to the door and operable to move door-inboard due to contact with the contact surface and then door-outboard into the receiving feature as the door moves from the open position into the closed position.

* * * * *